US012789971B1

(12) United States Patent
Stoddard

(10) Patent No.: US 12,789,971 B1
(45) Date of Patent: Nov. 10, 2026

(54) THERMOPLASTIC TENSION JOIN ARCHITECTURE FOR JOINING FUSELAGE SECTIONS

(71) Applicant: The Boeing Company, Arlington, VA (US)

(72) Inventor: Zachary Nathaniel Stoddard, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 19/404,384

(22) Filed: Dec. 1, 2025

(51) Int. Cl.
*B64C 1/06* (2006.01)
*B29C 65/00* (2006.01)
*B29C 65/56* (2006.01)
*B29L 31/30* (2006.01)
*B64C 1/12* (2006.01)

(52) U.S. Cl.
CPC .............. *B64C 1/069* (2013.01); *B29C 65/56* (2013.01); *B29C 66/1312* (2013.01); *B64C 1/061* (2013.01); *B64C 1/064* (2013.01); *B64C 1/12* (2013.01); *B29L 2031/3082* (2013.01)

(58) Field of Classification Search
CPC ......... B64C 1/069; B64C 1/061; B64C 1/064; B29L 2031/3082
See application file for complete search history.

(56) References Cited

U.S. PATENT DOCUMENTS

| | | | | |
|---|---|---|---|---|
| 7,527,222 | B2 * | 5/2009 | Biornstad | B29C 53/587 244/119 |
| 8,215,584 | B2 * | 7/2012 | Cazeneuve | B64C 1/069 244/119 |
| 8,715,808 | B2 * | 5/2014 | Roming | B64C 1/064 428/113 |
| 8,960,606 | B2 * | 2/2015 | Diep | B64C 1/069 244/131 |
| 10,150,553 | B2 * | 12/2018 | Cacciaguerra | B64C 1/069 |
| 10,308,345 | B2 * | 6/2019 | Marks | B64C 3/182 |
| 11,919,617 | B2 * | 3/2024 | Macko | B64C 1/069 |

* cited by examiner

*Primary Examiner* — Brian M O'Hara
(74) *Attorney, Agent, or Firm* — Yee & Associates, P.C.

(57) ABSTRACT

A high-rate thermoplastic join architecture is presented. Embodiments of the present disclosure include a thermoplastic tension joint for high-rate fuselage circumferential joins including a first skin panel mechanically coupled to a second skin panel; a first stringer mechanically coupled to the first skin panel; a second stringer mechanically coupled to the second skin panel; a first thermoplastic frame detail mechanically coupled to the first skin panel; a second thermoplastic frame detail mechanically coupled to the second skin panel; a first thermoplastic stringer fitting set mechanically coupled to both the first stringer and the first thermoplastic frame detail; and a second thermoplastic stringer fitting set mechanically coupled to both the second stringer and the second thermoplastic frame detail. Methods are also presented.

20 Claims, 19 Drawing Sheets

THERMOPLASTIC TENSION JOIN ARCHITECTURE FOR JOINING FUSELAGE SECTIONS

BACKGROUND INFORMATION

1. Field

The present disclosure relates generally to thermoplastic tension joint architecture for joining fuselage sections. In more detail, embodiments of the present disclosure relate to thermoplastic fuselage tension splices based on a high-rate thermoplastic join architecture. In particular, embodiments of the present disclosure relate to thermoplastic tension joints for high-rate fuselage circumferential joins.

2. Background

Aircraft body joins are used to join adjacent aircraft body sections. These joins are completed in final assembly which is often on the critical path in the factory and takes a significant amount of flow in the factory. These joins are typically shear joints that are located, drilled and filled at final assembly.

Therefore, it would be desirable to have apparatus and methods that take into account at least some of the issues discussed above, as well as other possible issues.

SUMMARY

An embodiment of the present disclosure provides a high-rate thermoplastic join architecture, comprising: a thermoplastic tension joint comprising: a first skin panel mechanically coupled to a second skin panel; a first stringer mechanically coupled to the first skin panel; a second stringer mechanically coupled to the second skin panel; a first thermoplastic frame detail mechanically coupled to the first skin panel; a second thermoplastic frame detail mechanically coupled to the second skin panel; a first thermoplastic stringer fitting set mechanically coupled to both the first stringer and the first thermoplastic frame detail; and a second thermoplastic stringer fitting set mechanically coupled to both the second stringer and the second thermoplastic frame detail, wherein the first thermoplastic frame detail is mechanically coupled to the second thermoplastic frame detail with at least one fastener that passes through at least a portion of the first thermoplastic stringer fitting set, the first thermoplastic frame detail, the second thermoplastic frame detail, and at least a portion of the second thermoplastic stringer fitting set.

Another embodiment of the present disclosure provides a thermoplastic tension joint for high-rate fuselage circumferential joins, comprising: a first skin panel mechanically coupled to a second skin panel; a first stringer mechanically coupled to the first skin panel; a second stringer mechanically coupled to the second skin panel; a first thermoplastic frame detail mechanically coupled to the first skin panel; a second thermoplastic frame detail mechanically coupled to the second skin panel; a first thermoplastic stringer fitting set mechanically coupled to both the first stringer and the first thermoplastic frame detail; and a second thermoplastic stringer fitting set mechanically coupled to both the second stringer and the second thermoplastic frame detail, wherein the first thermoplastic frame detail is mechanically coupled to the second thermoplastic frame detail with at least one fastener that passes through at least a portion of the first thermoplastic stringer fitting set, the first thermoplastic frame detail, the second thermoplastic frame detail, and at least a portion of the second thermoplastic stringer fitting set, wherein at least one of the first thermoplastic frame detail and the second thermoplastic frame detail comprises a plurality of interlaminar layers, and wherein at least one of the first thermoplastic stringer fitting and the second thermoplastic stringer fitting comprises a plurality of interlaminar layers.

Another embodiment of the present disclosure provides a method of high-rate thermoplastic joining using a tension joint, comprising: providing a first skin panel and a second skin panel; coupling mechanically a first stringer to the first skin panel; coupling mechanically a second stringer to the second skin panel; coupling mechanically a first thermoplastic frame detail to the first skin panel; coupling mechanically a second thermoplastic frame detail to the second skin panel; coupling mechanically a first thermoplastic stringer fitting set to both the first stringer and the first thermoplastic frame detail; coupling mechanically a second thermoplastic stringer fitting set to both the second stringer and the second thermoplastic frame detail; and coupling mechanically the first thermoplastic frame detail to the second thermoplastic frame detail with at least one fastener that passes through the first thermoplastic stringer fitting, the first thermoplastic frame detail, the second thermoplastic frame detail, and the second thermoplastic stringer fitting.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The embodiments and illustrative examples recognize and take into account several considerations. Embodiments of the present disclosure can be utilized within a fuselage co-cured skin/stringer architecture similar to 787 (body sections to be joined) and utilizes thermoplastic materials/fittings/detail parts for the fuselage joins. These fittings/details can include thermoplastic stringer fitting sets and thermoplastic frame details. These fittings/details are designed to utilized thermoplastic consolidation processes and stamp forming capabilities. The fittings/details can be used in various areas of the joins which reduces the quantity of unique fitting/detail parts. Multiple versions of the fittings can provide a multiple number of load paths from the fuselage skin/stringer to mid-bay or on-station 'frame' depending on stress and sizing requirements. Embodiments of this disclosure enable performing more work outside of the typical final assembly flow compared to pre-final assembly flow, which can enable high rate fuselage joins. Embodiments can be utilized in body joins which are mid-bay or on-station.

Embodiments of this disclosure can include high-rate thermoplastic stamp forming for fitting/detail part fabrication. Thermoplastic details (including stringer fittings & frame details) are designed to be fabricated with thermoplastic stamp forming processes where flat laminates are consolidated and then formed in either a 1-stage or 2-stage forming process to the final shape. Additionally, with the improved mechanical properties of thermoplastics (i.e., those thermoplastics that include higher interlaminar fracture toughness compared to thermoset epoxy composites) the fittings/details can be utilized in a tension joint arrangement.

Embodiments of this disclosure can include assembly sequencing and driving more work to be performed prior to final assembly. The thermoplastic details can be fabricated and arranged to be fully fastened to the fuselage sections prior to final body join. This results in roughly 75% of fasteners being installed prior to final assembly, which is typically on the critical path. The only fasteners which may need to be installed at final assembly are the fasteners that pass through frame details located on both of the sections being joined (e.g. see FIGS. 5, 6, 8-9, 11-12 and 15-17). Additionally, all shimming is perceived to be able to be completed prior to final assembly.

In some embodiments, the thermoplastic tension joint is located between circumferential fuselage sections. In some embodiments, the thermoplastic tension joint is coincident with a fuselage frame station.

Figure 1:
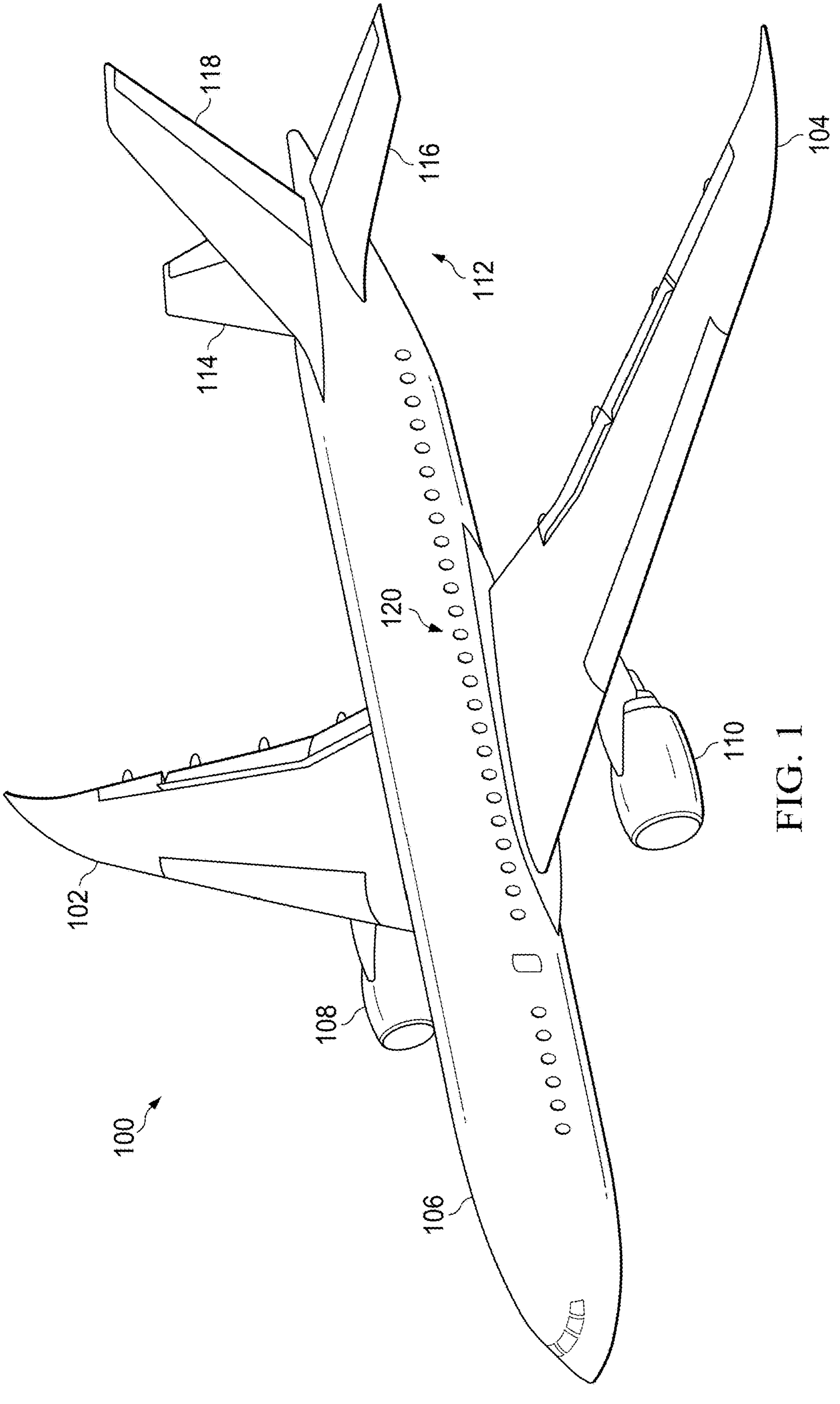
FIG. 1 is an illustration of an aircraft in accordance with an illustrative embodiment of the present disclosure.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. Body 106 has plurality of windows 120.

Aircraft 100 is an example of an aircraft that can have a high-rate thermoplastic join architecture. In this illustrative example, high-rate thermoplastic join architecture can be present in body 106.

Figure 2:
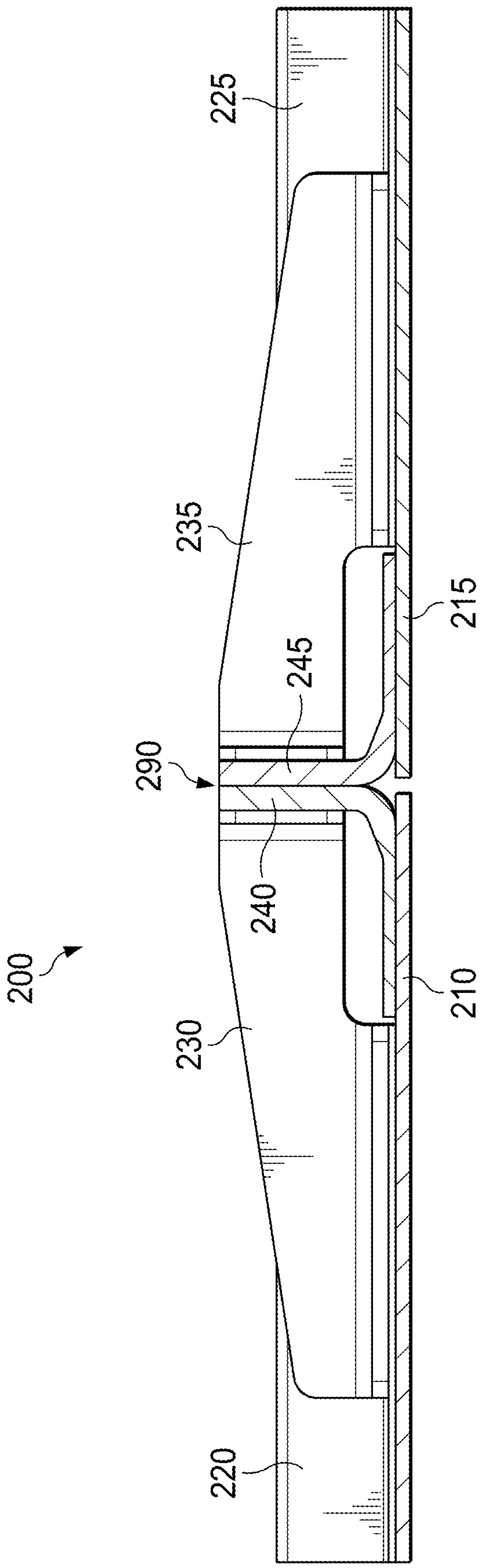
FIG. 2 is an orthographic illustration of an assembly in accordance with an illustrative embodiment of the present disclosure.

Turning now to FIG. 2 an illustration of a high-rate thermoplastic join architecture is depicted in accordance with an illustrative embodiment. Assembly 200 can be used in body 106 of aircraft 100 in FIG. 1. Assembly 200 is an example of a mid-bay assembly. Assembly 200 includes aft skin panel 210. Assembly 200 includes forward skin panel 215. Assembly 200 includes aft stringer 220. Assembly 200 includes forward stringer 225. Assembly 200 includes aft thermoplastic stringer fitting 230. Assembly 200 includes forward thermoplastic stringer fitting 235. Assembly 200 includes aft thermoplastic frame detail 240. Assembly 200 includes forward thermoplastic frame detail 245. Aft thermoplastic frame detail 240 and forward thermoplastic frame detail 245 together define back to back frame section 290. Back to back frame section 290 can be segmented in the hoop direction for fail safety. Load paths from stringer to frame prevent dis-bonding of stringers both forward and aft. A horizontal load path passes through the thermoplastic frame details. Vertical load paths pass through the skin panels and the thermoplastic frame details or the thermoplastic stringer fittings. Of note, there are no splice plates in this embodiment.

The illustration of assembly 200 in FIG. 2 is not meant to imply physical or architectural limitations to the manner in which an illustrative embodiment may be implemented. Other components in addition to or in place of the ones illustrated may be used. Some components may be unnecessary.

Figure 3:
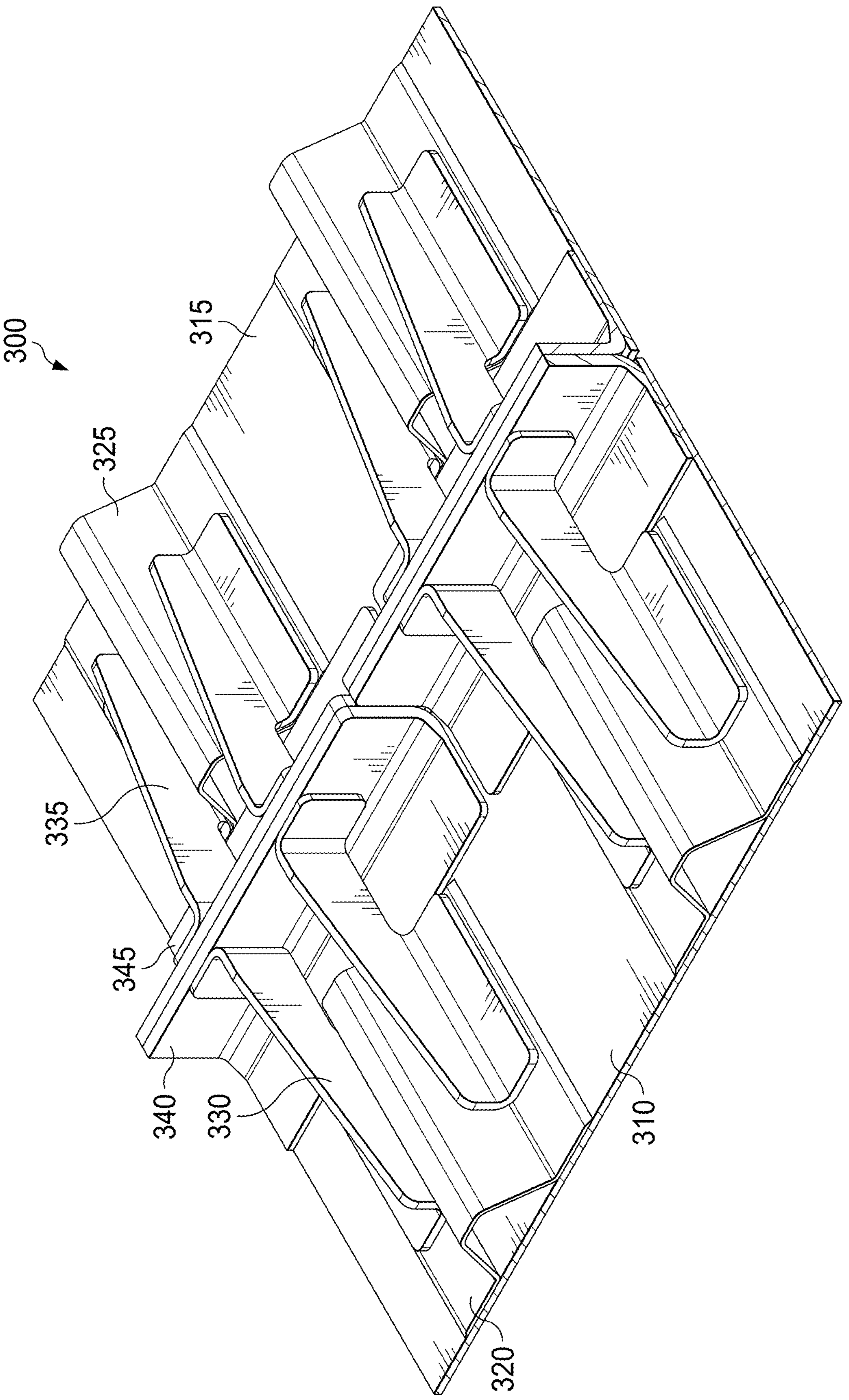
FIG. 3 is an isometric illustration of an assembly in accordance with an illustrative embodiment of the present disclosure.

Turning now to FIG. 3, an isometric illustration of an assembly 300 is depicted in accordance with an illustrative embodiment. Assembly 300 is an example of a mid-bay assembly. Assembly 300 includes aft skin panel 310. Assembly 300 includes forward skin panel 315. Assembly 300 includes aft stringer 320. Assembly 300 includes forward stringer 325. Assembly 300 includes aft thermoplastic stringer fitting 330. Assembly 300 includes forward thermoplastic stringer fitting 335. Assembly 300 includes aft thermoplastic frame detail 340. Assembly 300 includes forward thermoplastic frame detail 345.

The illustrations in FIGS. 3-17 are not meant to imply physical or architectural limitations to the manner in which an illustrative embodiment may be implemented. Other components in addition to or in place of the ones illustrated may be used. Some components may be unnecessary. Of note, the stringer fittings and frame details are fabricated from thermoplastic in these embodiments. Suitable thermoplastics include, for example, polycarbonate, polyetheretherketone, polyetherketoneketone, polyamide (-imide), and/or polyetherimide; all optionally with interlaminar layer(s) and/or (carbon) fiber reinforcement.

Figure 4:
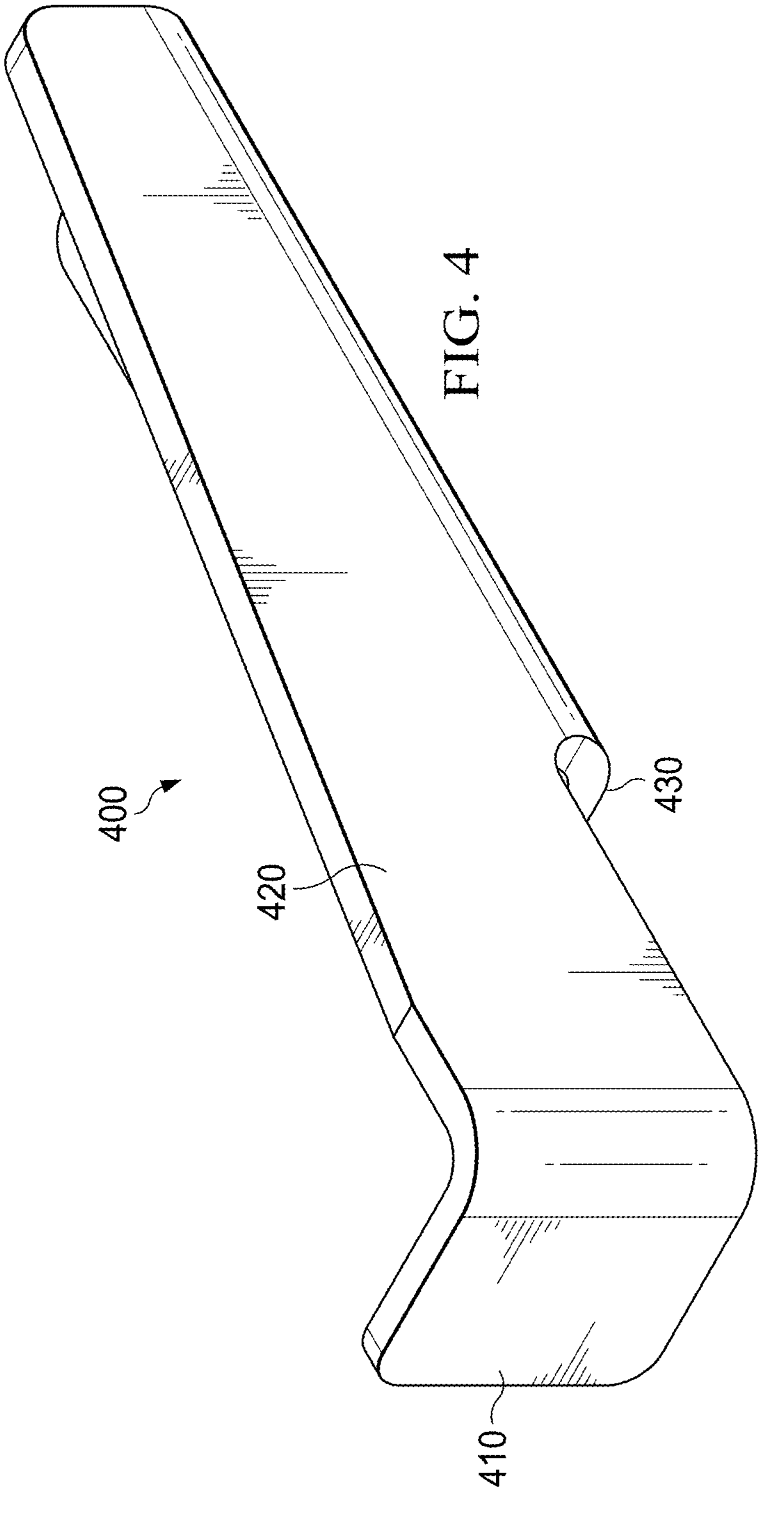
FIG. 4 is an isometric illustration of a thermoplastic stringer fitting in accordance with an illustrative embodiment of the present disclosure.

Turning now to FIG. 4, an isometric illustration of a thermoplastic stringer fitting 400 is depicted in accordance with an illustrative embodiment of the present disclosure. Thermoplastic stringer fitting 400 is an example of a first tension fitting concept that can be fabricated using stamp forming in 1 stage. Thermoplastic stringer fitting 400 includes frame detail flange 410. Thermoplastic stringer fitting 400 includes orthogonal web 420. Thermoplastic stringer fitting 400 includes stringer flange 430.

Figure 5:
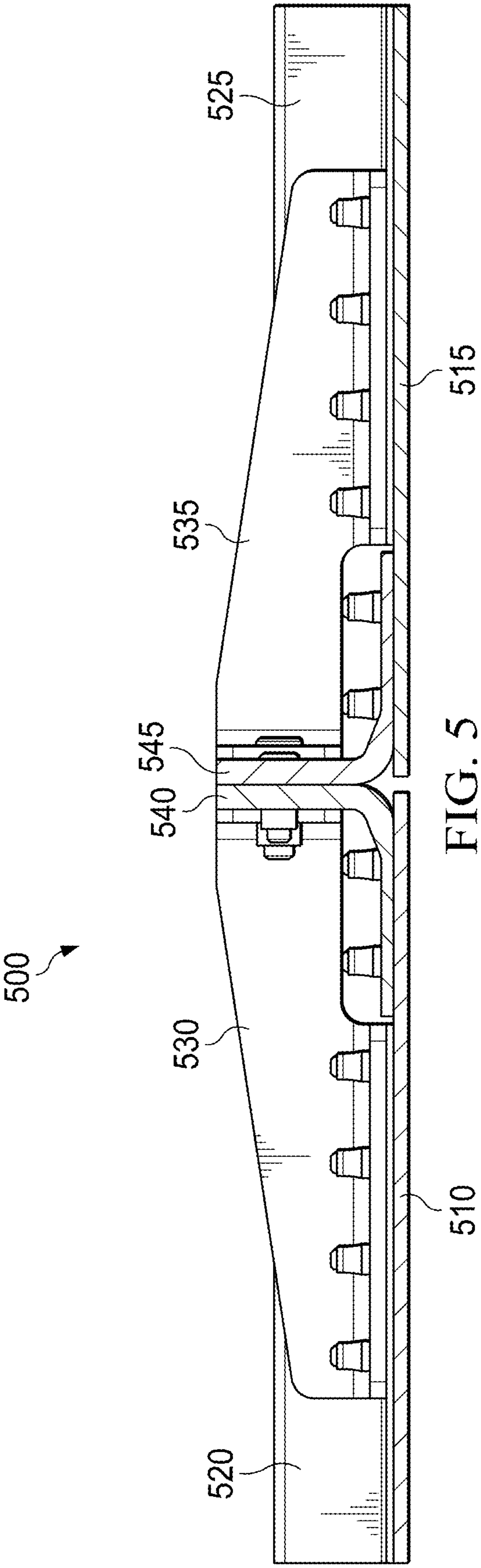
FIG. 5 is an orthographic illustration of an assembly in accordance with an illustrative embodiment of the present disclosure.

Turning now to FIG. 5, an orthographic illustration of an assembly 500 is depicted in accordance with an illustrative embodiment of the present disclosure. Assembly 500 is an example of a mid-bay assembly. Assembly 500 includes aft skin panel 510. Assembly 500 includes forward skin panel 515. Assembly 500 includes aft stringer 520. Assembly 500 includes forward stringer 525. Assembly 500 includes aft thermoplastic stringer fitting 530. Assembly 500 includes forward thermoplastic stringer fitting 535. Assembly 500 includes aft thermoplastic frame detail 540. Assembly 500 includes forward thermoplastic frame detail 545.

Figure 6:
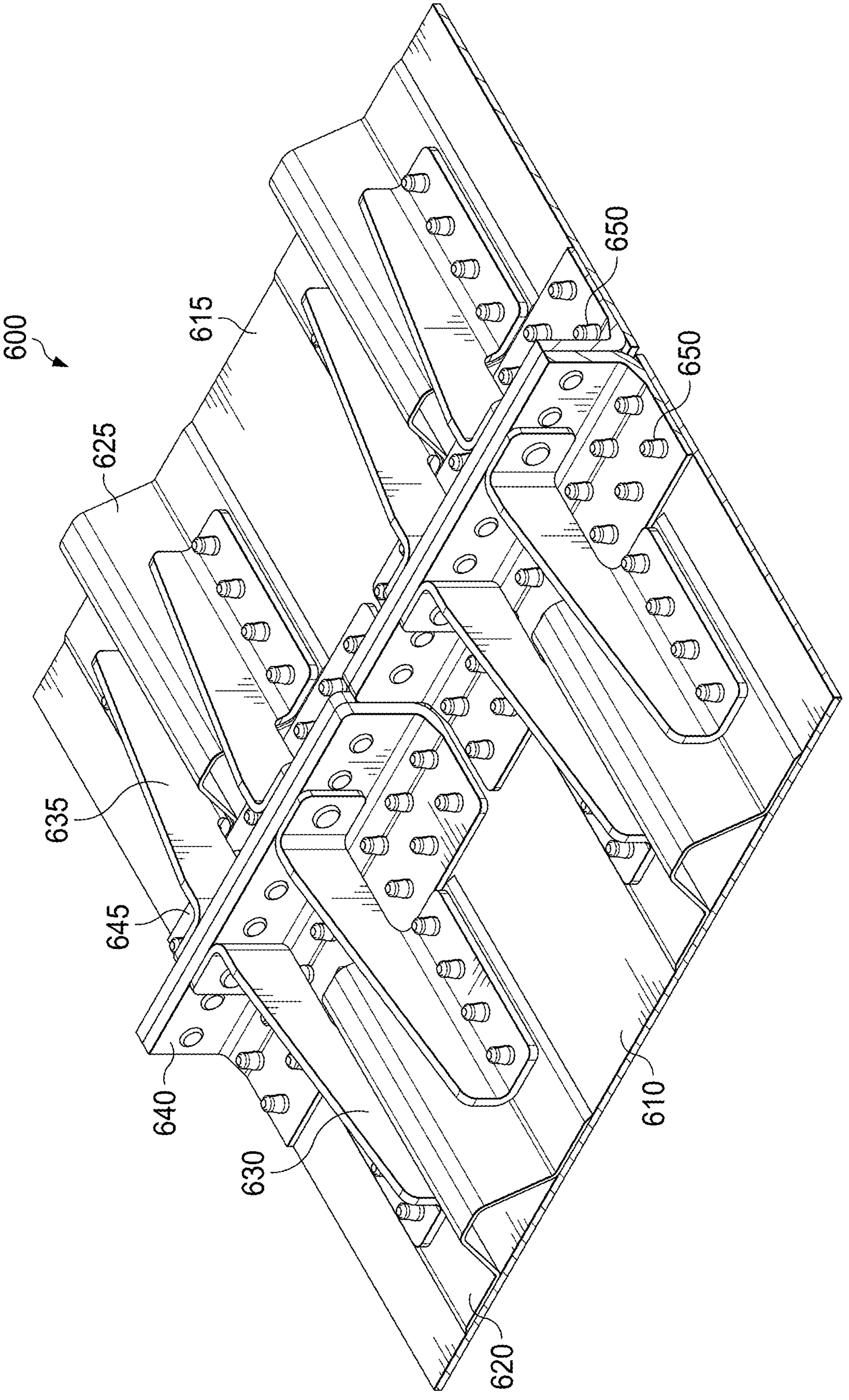
FIG. 6 is an isometric illustration of an assembly in accordance with an illustrative embodiment of the present disclosure.

Turning now to FIG. 6, an isometric illustration of an assembly 600 is depicted in accordance with an illustrative embodiment of the present disclosure. Assembly 600 is an example of a mid-bay assembly. Assembly 600 includes aft skin panel 610. Assembly 600 includes forward skin panel 615. Assembly 600 includes aft stringer 620. Assembly 600 includes forward stringer 625. Assembly 600 includes aft thermoplastic stringer fitting 630. Assembly 600 includes forward thermoplastic stringer fitting 635. Assembly 600 includes aft thermoplastic frame detail 640. Assembly 600 includes forward thermoplastic frame detail 645. In FIG. 6, fasteners 650 can be seen on aft thermoplastic stringer fitting 630, forward thermoplastic stringer fitting 635, aft thermoplastic frame detail 640 and forward thermoplastic frame detail 645.

Figure 7:
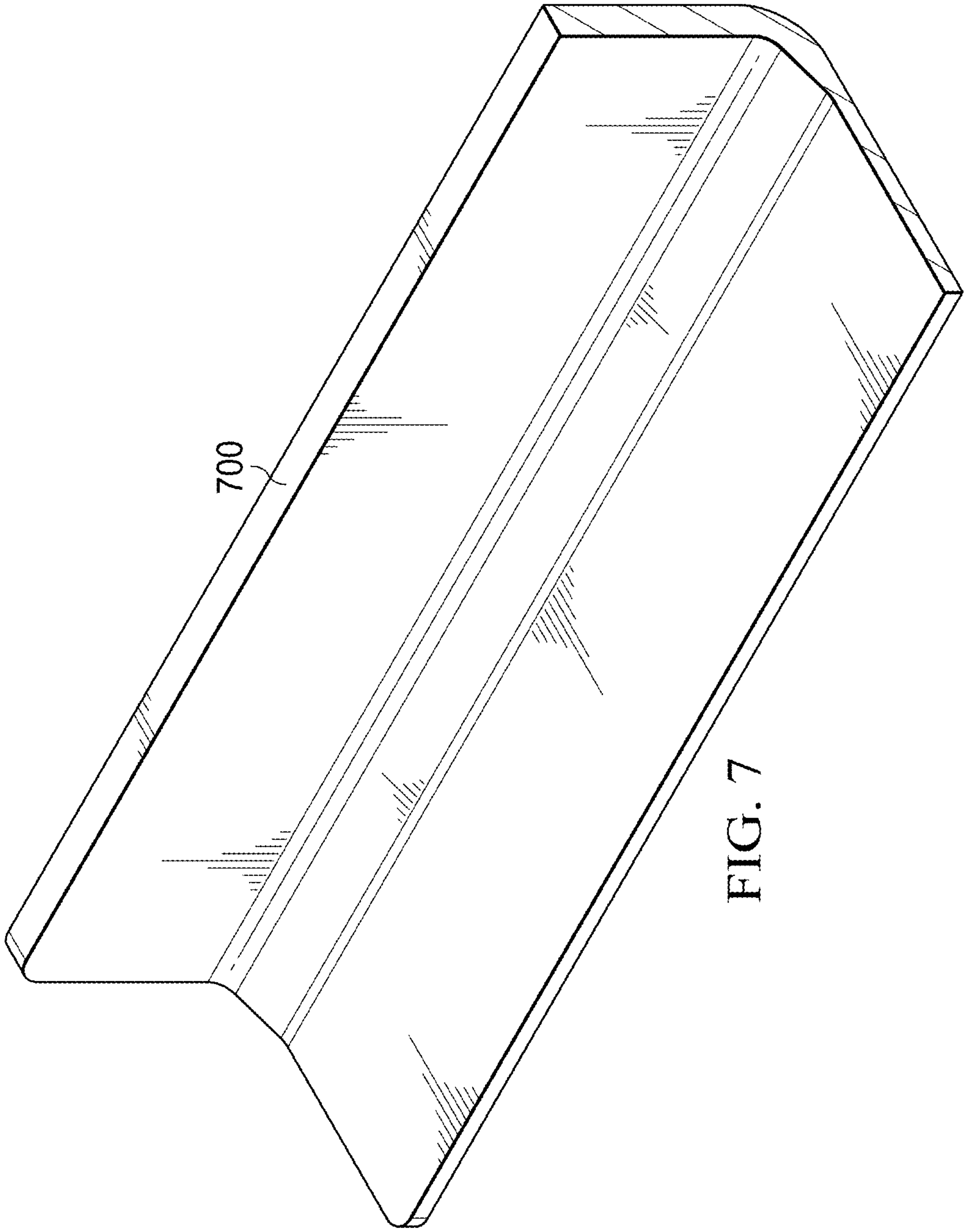
FIG. 7 is an isometric illustration of a thermoplastic frame detail in accordance with an illustrative embodiment of the present disclosure.

Turning now to FIG. 7, an isometric illustration of a thermoplastic frame detail 700 is depicted in accordance with an illustrative embodiment of the present disclosure. Thermoplastic frame detail 700 is an example of a portion of a mid-bay frame.

Figure 8:
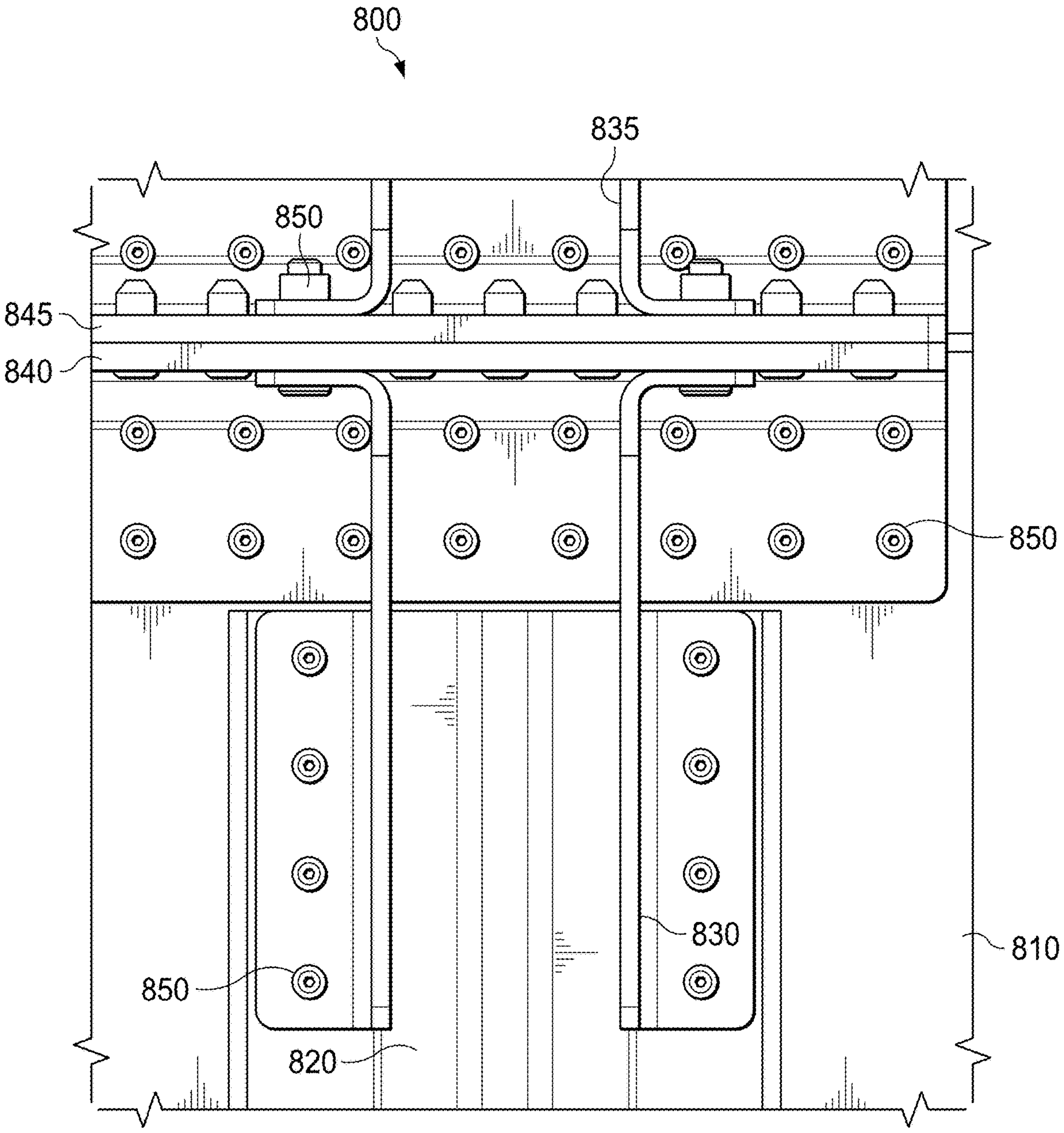
FIG. 8 is an orthographic illustration of an assembly in accordance with an illustrative embodiment of the present disclosure.

Turning now to FIG. 8, an orthographic illustration of an assembly 800 is depicted in accordance with an illustrative embodiment of the present disclosure. Assembly 800 is an example of a mid-bay assembly. Assembly 800 includes aft skin panel 810. Assembly 800 includes aft stringer 820. Assembly 800 includes aft thermoplastic stringer fitting 830. Assembly 800 includes forward thermoplastic stringer fitting 835. Assembly 800 includes aft thermoplastic frame detail 840. Assembly 800 includes forward thermoplastic frame detail 845. In FIG. 8, fasteners 850 can be seen on aft thermoplastic stringer fitting 830, forward thermoplastic stringer fitting 835, aft thermoplastic frame detail 840 and forward thermoplastic frame detail 845.

Figure 9:
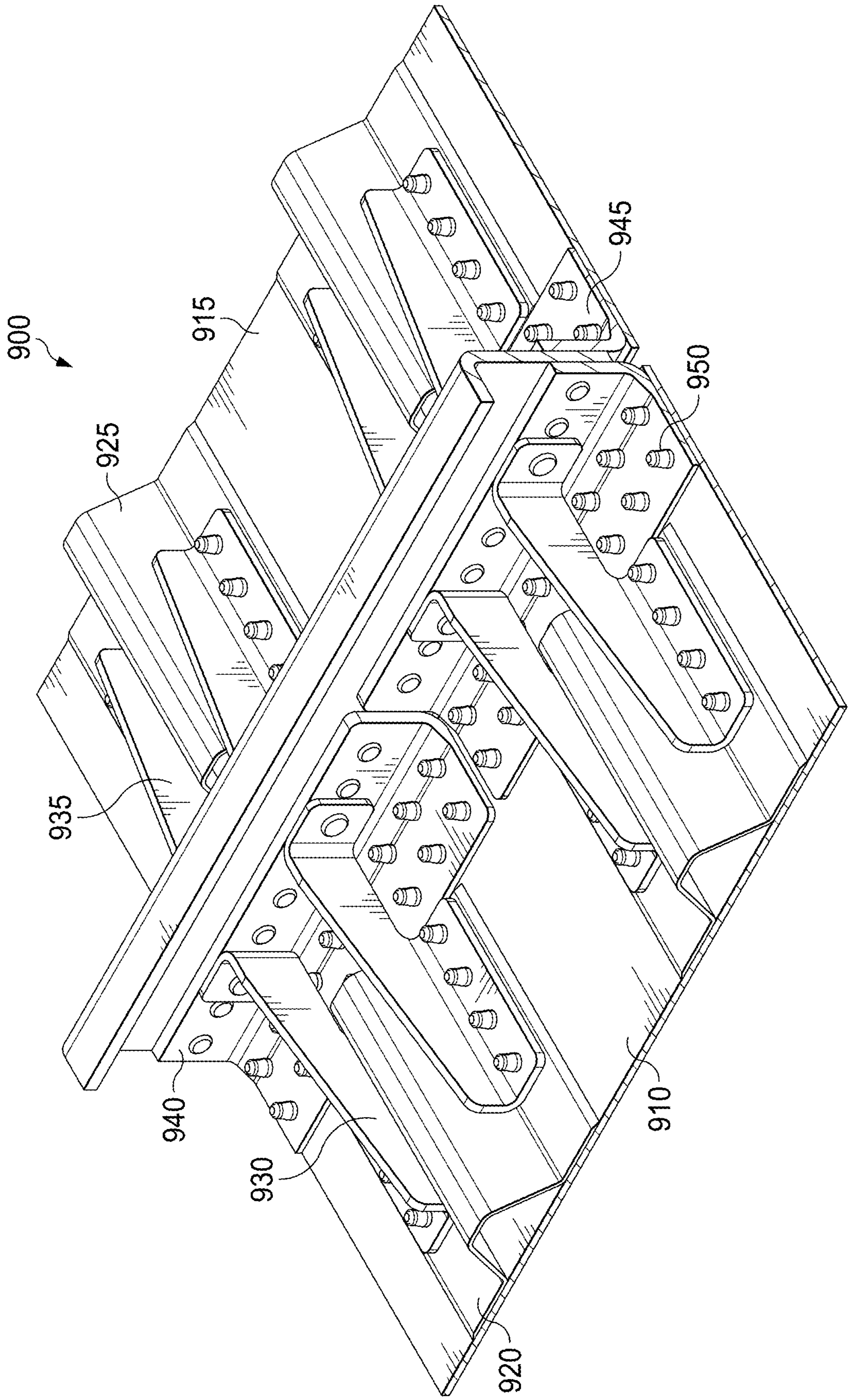
FIG. 9 is an isometric illustration of an assembly in accordance with an illustrative embodiment of the present disclosure.

Turning now to FIG. 9, an isometric illustration of an assembly 900 is depicted in accordance with an illustrative embodiment of the present disclosure. Assembly 900 is an example of an on-station assembly. Assembly 900 includes aft skin panel 910. Assembly 900 includes forward skin panel 915. Assembly 900 includes aft stringer 920. Assembly 900 includes forward stringer 925. Assembly 900 includes aft thermoplastic stringer fitting 930. Assembly 900 includes forward thermoplastic stringer fitting 935. Assembly 900 includes aft thermoplastic frame detail 940. Assembly 900 includes forward thermoplastic frame detail 945. In FIG. 9, fasteners 950 can be seen on aft thermoplastic stringer fitting 930, forward thermoplastic stringer fitting 935, aft thermoplastic frame detail 940 and forward thermoplastic frame detail 945.

Figure 10:
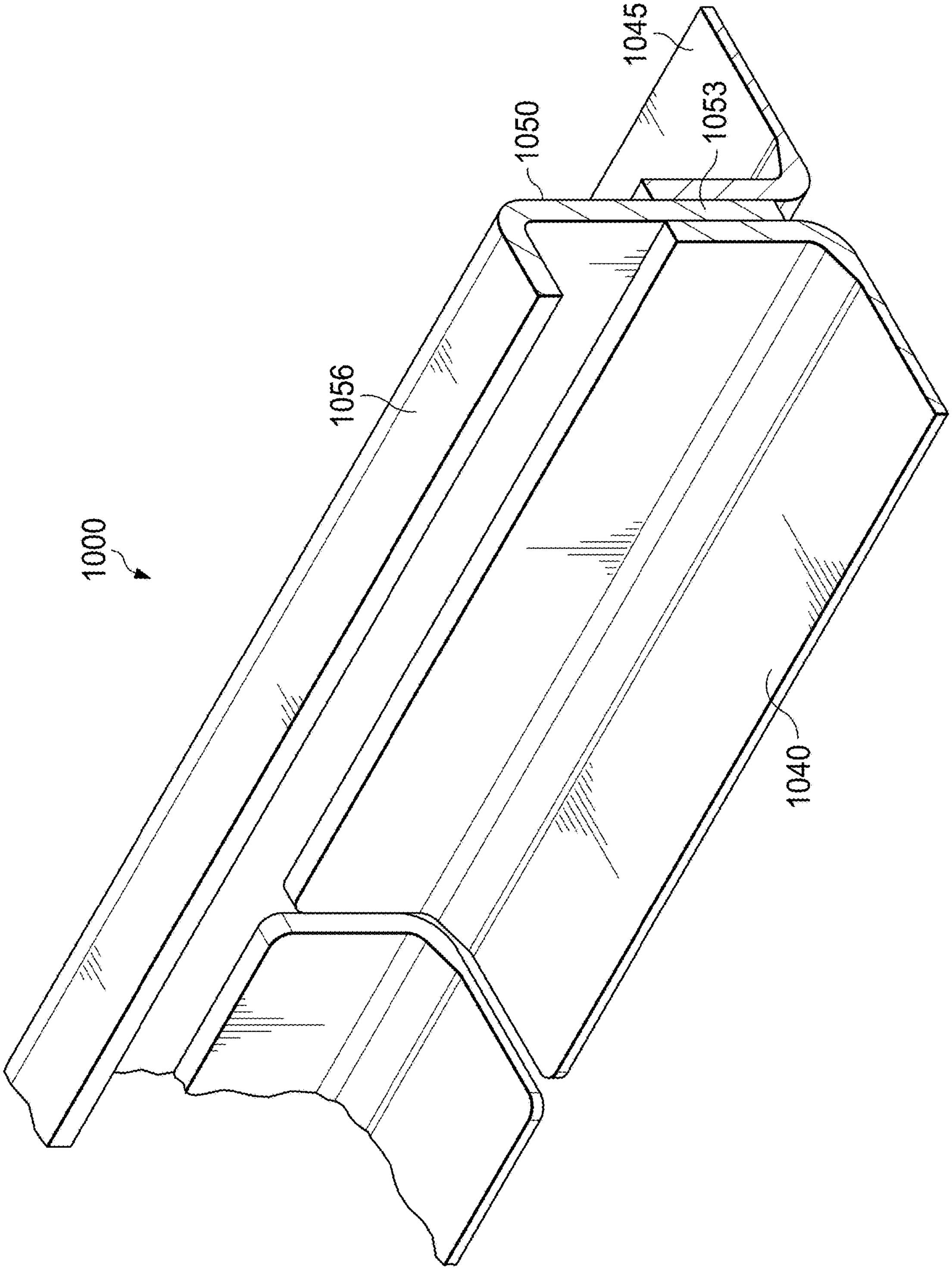
FIG. 10 is an isometric illustration of a subassembly of thermoplastic frame details in accordance with an illustrative embodiment of the present disclosure.

Turning now to FIG. 10, an isometric illustration of an assembly 1000 of thermoplastic frame details is depicted in accordance with an illustrative embodiment of the present disclosure. Assembly 1000 of thermoplastic frame details is an example of a portion of an on-station frame. Assembly 1000 includes aft thermoplastic frame detail 1040. Assembly 1000 includes forward thermoplastic frame detail 1045. Assembly 1000 includes a third thermoplastic frame detail 1050. The third thermoplastic frame detail 1050 includes a web 1053 and an inner cord flange 1056 that meet at an intersection.

Figure 11:
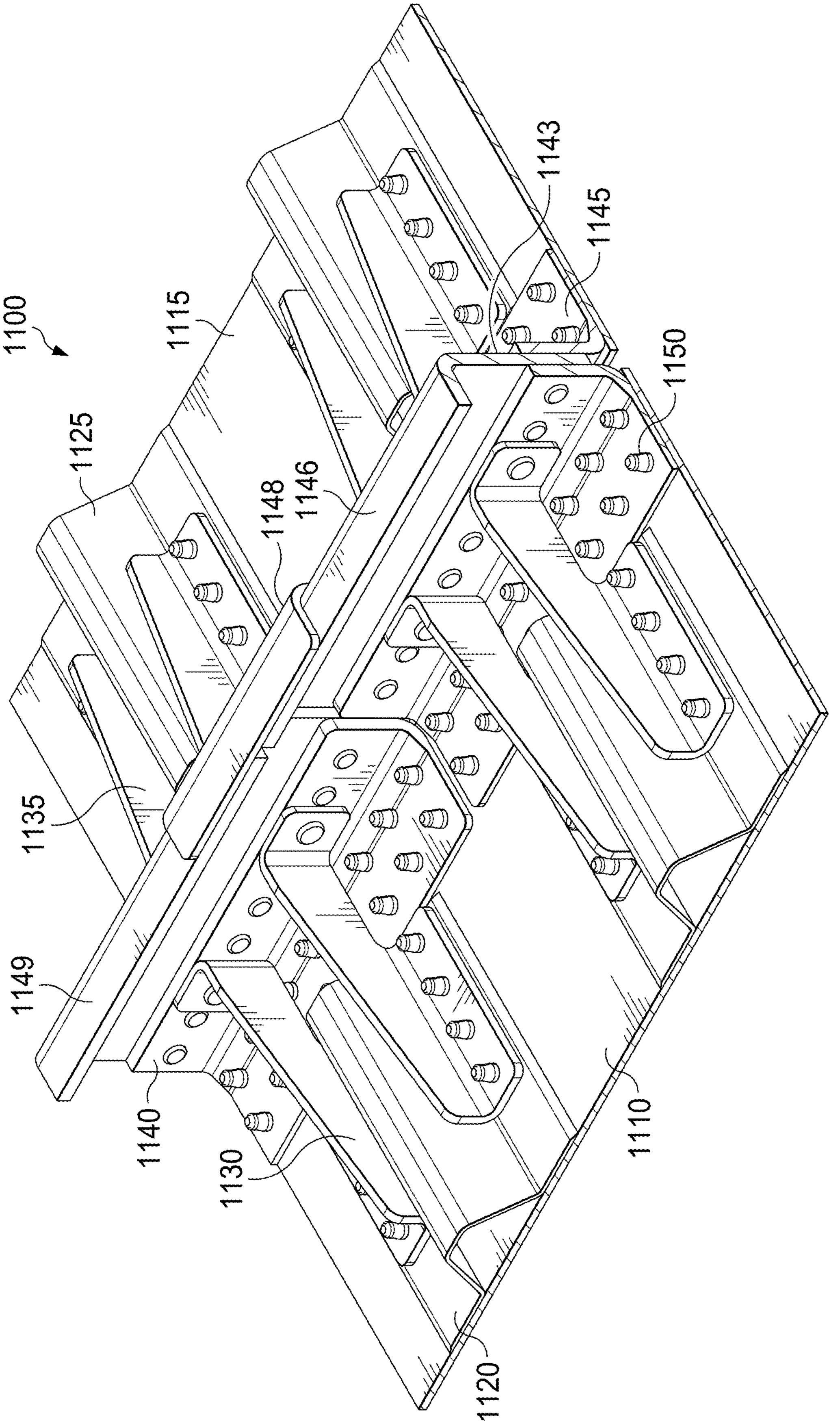
FIG. 11 is an isometric illustration of an assembly in accordance with an illustrative embodiment of the present disclosure.

Turning now to FIG. 11, an isometric illustration of an assembly 1100 is depicted in accordance with an illustrative embodiment of the present disclosure. Assembly 1100 is an example of an on-station assembly. Assembly 1100 includes aft skin panel 1110. Assembly 1100 includes forward skin panel 1115. Assembly 1100 includes aft stringer 1120. Assembly 1100 includes forward stringer 1125. Assembly 1100 includes aft thermoplastic stringer fitting 1130. Assembly 1100 includes forward thermoplastic stringer fitting 1135. Assembly 1100 includes aft thermoplastic frame detail 1140. Assembly 1100 includes forward thermoplastic frame detail 1145. The forward thermoplastic frame detail 1145 includes a web 1143 and an inner cord flange 1146 that meet at an intersection. Assembly 1100 includes frame detail coupler 1148 that bridges a gap between forward thermoplastic frame detail 1145 and another forward thermoplastic frame detail 1149. In FIG. 11, fasteners 1150 can be seen on aft thermoplastic stringer fitting 1130, forward thermoplastic stringer fitting 1135, aft thermoplastic frame detail 1140 and forward thermoplastic frame detail 1145. The embodiment depicted in FIG. 11 has 2 thermoplastic stringer fittings associated with each stringer. Thus, in this embodiment each thermoplastic stringer fitting set includes 2 thermoplastic stringer fittings; these can be termed left-hand and right-hand. In some embodiments, at least one of the first thermoplastic stringer fitting set and the second thermoplastic stringer fitting set comprises a pair of fittings, wherein each of the pair of fittings comprises a frame detail flange connected to an orthogonal web connected to a stringer flange.

Figure 12:
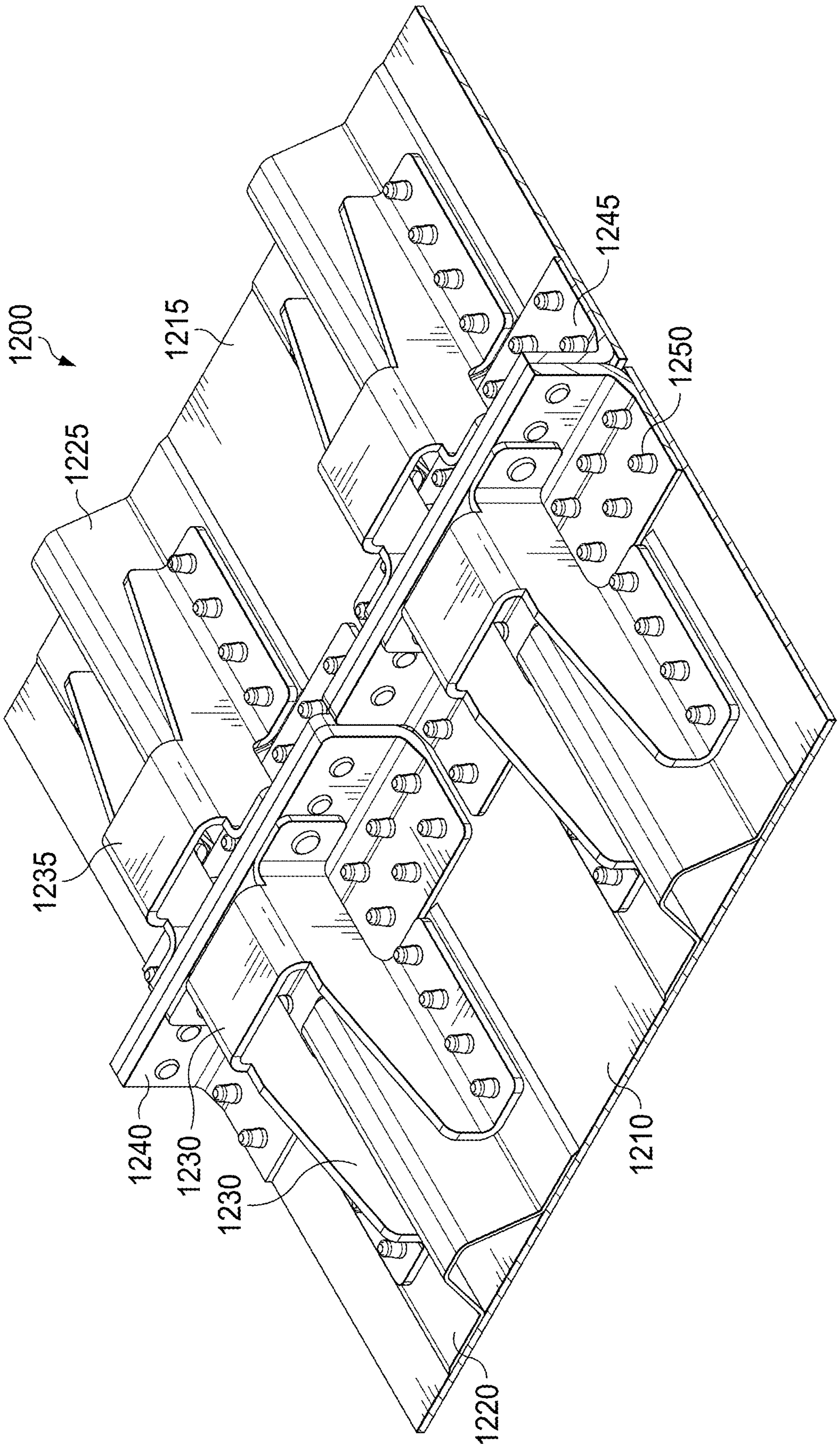
FIG. 12 is an isometric illustration of an assembly in accordance with an illustrative embodiment of the present disclosure.

Turning now to FIG. 12, an isometric illustration of an assembly 1200 is depicted in accordance with an illustrative embodiment of the present disclosure. Assembly 1200 is an example of a mid-bay assembly. Assembly 1200 includes aft skin panel 1210. Assembly 1200 includes forward skin panel 1215. Assembly 1200 includes aft stringer 1220. Assembly 1200 includes forward stringer 1225. Assembly 1200 includes aft thermoplastic stringer fitting 1230. Assembly 1200 includes forward thermoplastic stringer fitting 1235. Assembly 1200 includes aft thermoplastic frame detail 1240. Assembly 1200 includes forward thermoplastic frame detail 1245. In FIG. 12, fasteners 1250 can be seen on aft thermoplastic stringer fitting 1230, forward thermoplastic stringer fitting 1235, aft thermoplastic frame detail 1240 and forward thermoplastic frame detail 1245. The embodiment depicted in FIG. 12 has 1 thermoplastic stringer fitting associated with each stringer. Thus, in this embodiment each thermoplastic stringer fitting set includes 1 thermoplastic stringer fitting.

Figure 13:
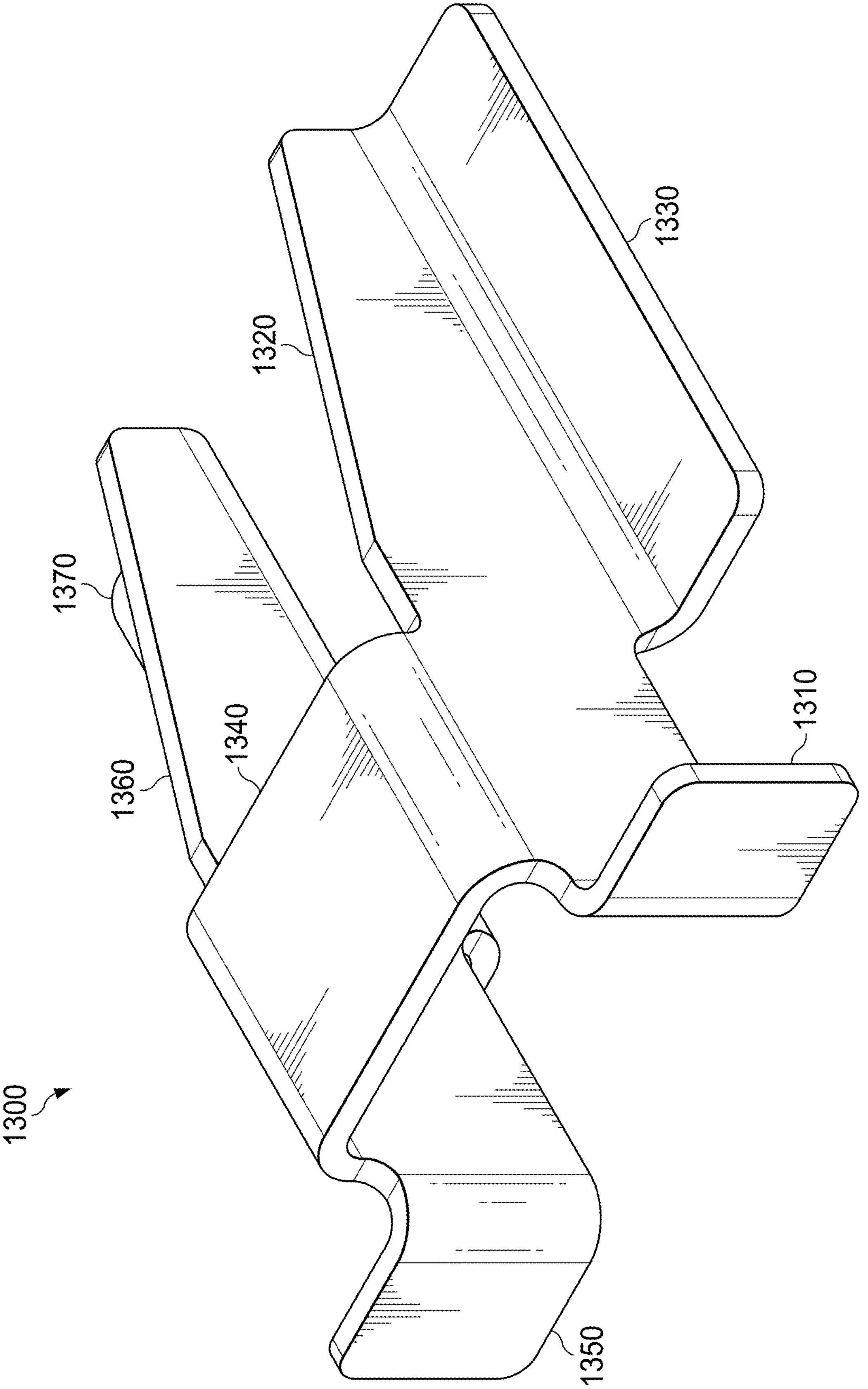
FIG. 13 is an isometric illustration of a thermoplastic stringer fitting in accordance with an illustrative embodiment of the present disclosure.

Turning now to FIG. 13, an isometric illustration of a thermoplastic stringer fitting 1300 is depicted in accordance with an illustrative embodiment of the present disclosure. Thermoplastic stringer fitting 1300 is an example of a second tension fitting concept that can be fabricated using stamp forming in 2 stages. Thermoplastic stringer fitting 1300 is a single fitting that comprises a first frame detail flange 1310 connected to a first orthogonal web 1320 connected to a first stringer flange 1330, a stiffening cap 1340 connected to the first orthogonal web 1320, a second frame detail flange 1350 connected to a second orthogonal web 1360 connected to a second stringer flange 1370. The stiffening cap 1340 is also connected to the second orthogonal web 1360 and spans a stringer when assembled. In addition to being stiffer as an integrated set that spans a stringer, thermoplastic stringer fitting 1300 is taller than the embodiment in FIG. 4; consequently, being capable of transferring a larger downward component onto the stringer it spans.

Figure 14:
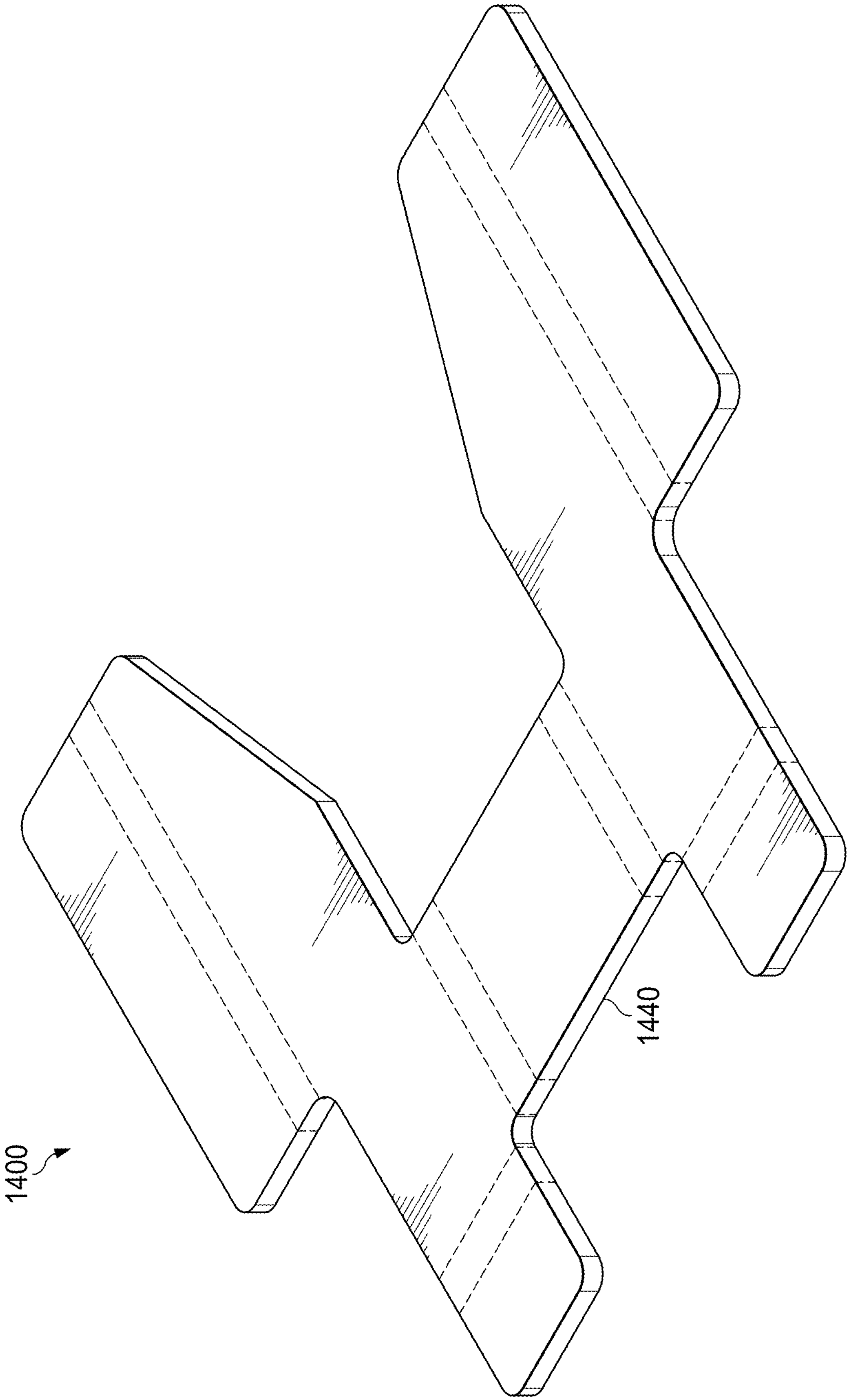
FIG. 14 is an isometric illustration of thermoplastic stringer fitting preform in accordance with an illustrative embodiment of the present disclosure.

Turning now to FIG. 14, an isometric illustration of thermoplastic stringer fitting preform 1400 is depicted in accordance with an illustrative embodiment of the present disclosure. Thermoplastic stringer fitting preform 1400 can be cut from flat stock with dimensions adjusted to allow for contraction resulting from stamp forming. Thermoplastic stringer fitting preform 1400 includes portion 1440 which after forming becomes the stiffening cap. Embodiments can include providing, before coupling mechanically the first thermoplastic frame detail to the first skin panel, a first thermoplastic frame detail preform shape; consolidating the first thermoplastic frame detail preform shape; and stamp forming the first thermoplastic frame detail preform shape into the first thermoplastic frame detail.

Figure 15:
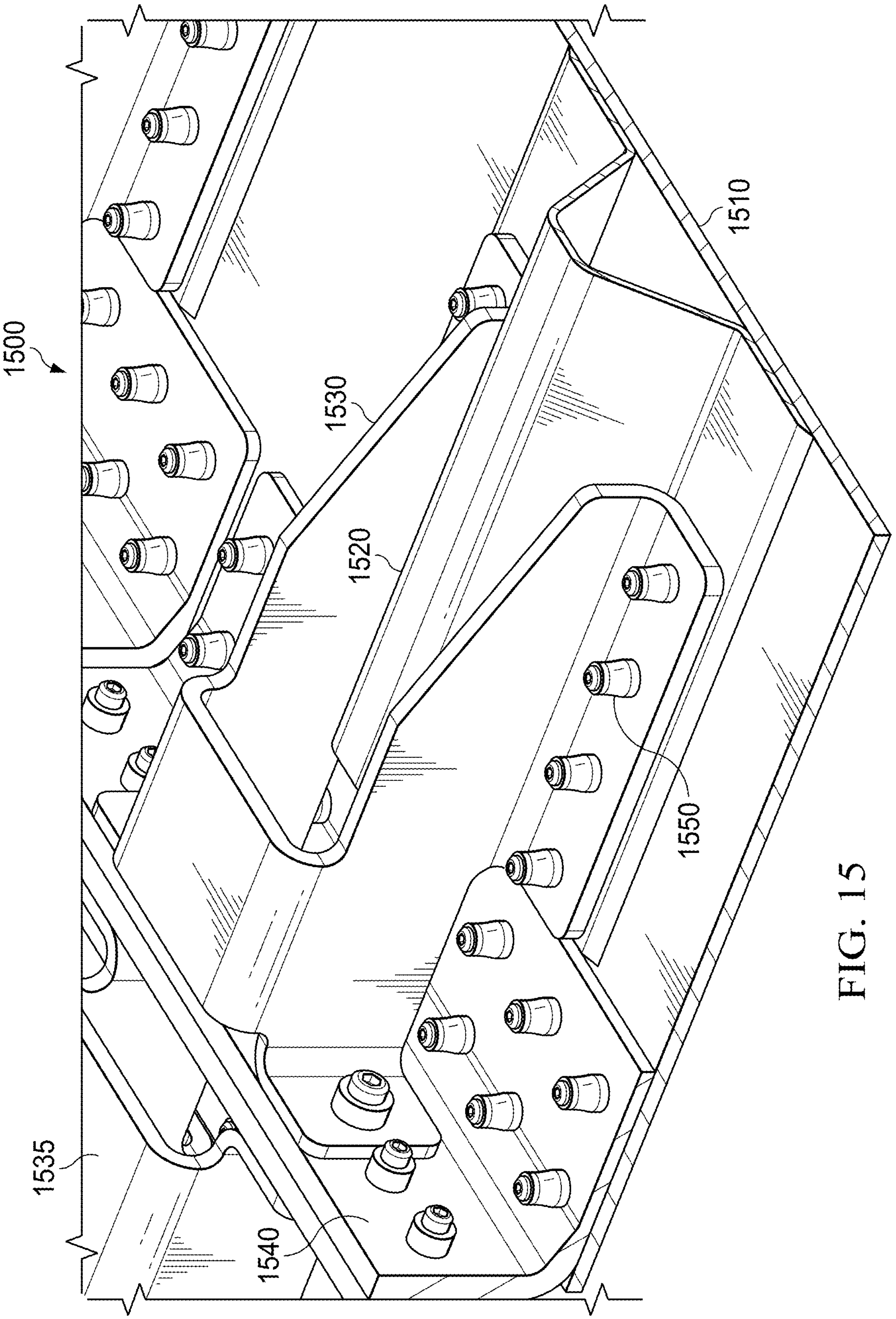
FIG. 15 is an isometric illustration of an assembly in accordance with an illustrative embodiment of the present disclosure.

Turning now to FIG. 15, an isometric illustration of an assembly 1500 is depicted in accordance with an illustrative embodiment of the present disclosure. Assembly 1500 is an example of a mid-bay assembly. Assembly 1500 includes aft skin panel 1510. Assembly 1500 includes aft stringer 1520. Assembly 1500 includes aft thermoplastic stringer fitting 1530. Assembly 1500 includes forward thermoplastic stringer fitting 1535. Assembly 1500 includes aft thermoplastic frame detail 1540. Assembly 1500 includes forward thermoplastic frame detail 1545. In FIG. 15, fasteners 1550 can be seen on aft thermoplastic stringer fitting 1530 and aft thermoplastic frame detail 1540. The embodiment depicted in FIG. 15 has 1 thermoplastic stringer fitting associated with each stringer. Thus, in this embodiment each thermoplastic stringer fitting set includes 1 thermoplastic stringer fitting.

Figure 16:
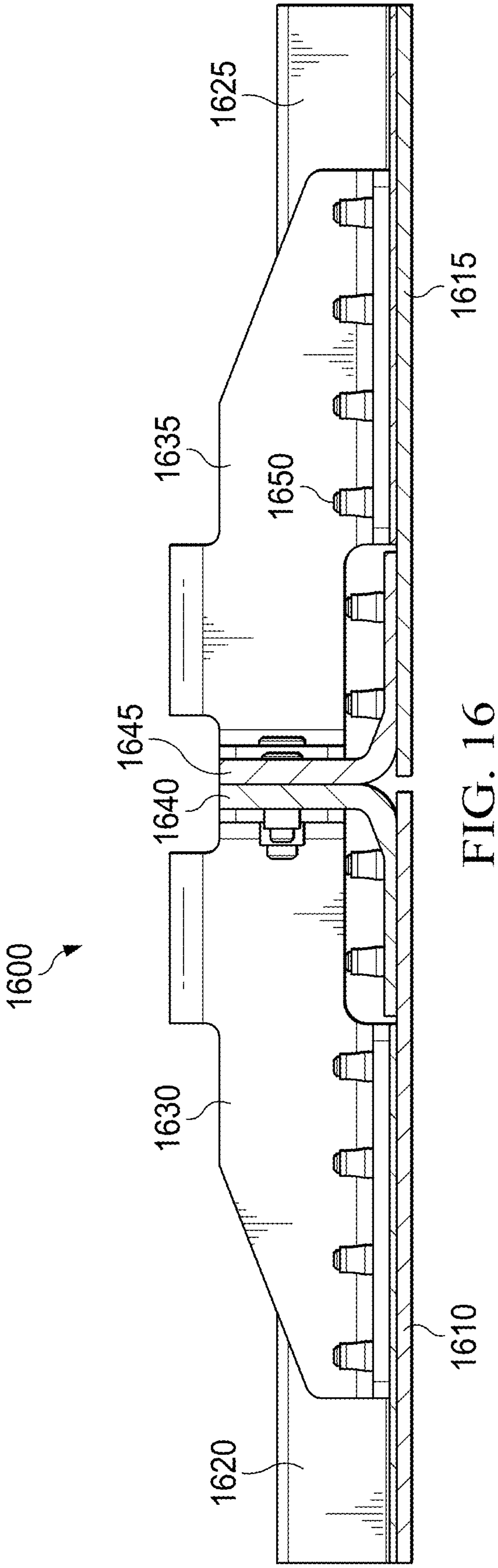
FIG. 16 is an orthographic illustration of an assembly in accordance with an illustrative embodiment of the present disclosure.

Turning now to FIG. 16, an orthographic illustration of an assembly 1600 is depicted in accordance with an illustrative embodiment of the present disclosure. Assembly 1600 is an example of a mid-bay assembly. Assembly 1600 includes aft skin panel 1610. Assembly 1600 includes forward skin panel 1615. Assembly 1600 includes aft stringer 1620. Assembly 1600 includes forward stringer 1625. Assembly 1600 includes aft thermoplastic stringer fitting 1630. Assembly 1600 includes forward thermoplastic stringer fitting 1635. Assembly 1600 includes aft thermoplastic frame detail 1640. Assembly 1600 includes forward thermoplastic frame detail 1645. In FIG. 16, fasteners 1650 can be seen on aft thermoplastic stringer fitting 1630, forward thermoplastic stringer fitting 1635, aft thermoplastic frame detail 1640 and forward thermoplastic frame detail 1645. The embodiment depicted in FIG. 16 has 1 thermoplastic stringer fitting associated with each stringer. Thus, in this embodiment each thermoplastic stringer fitting set includes 1 thermoplastic stringer fitting.

Figure 17:
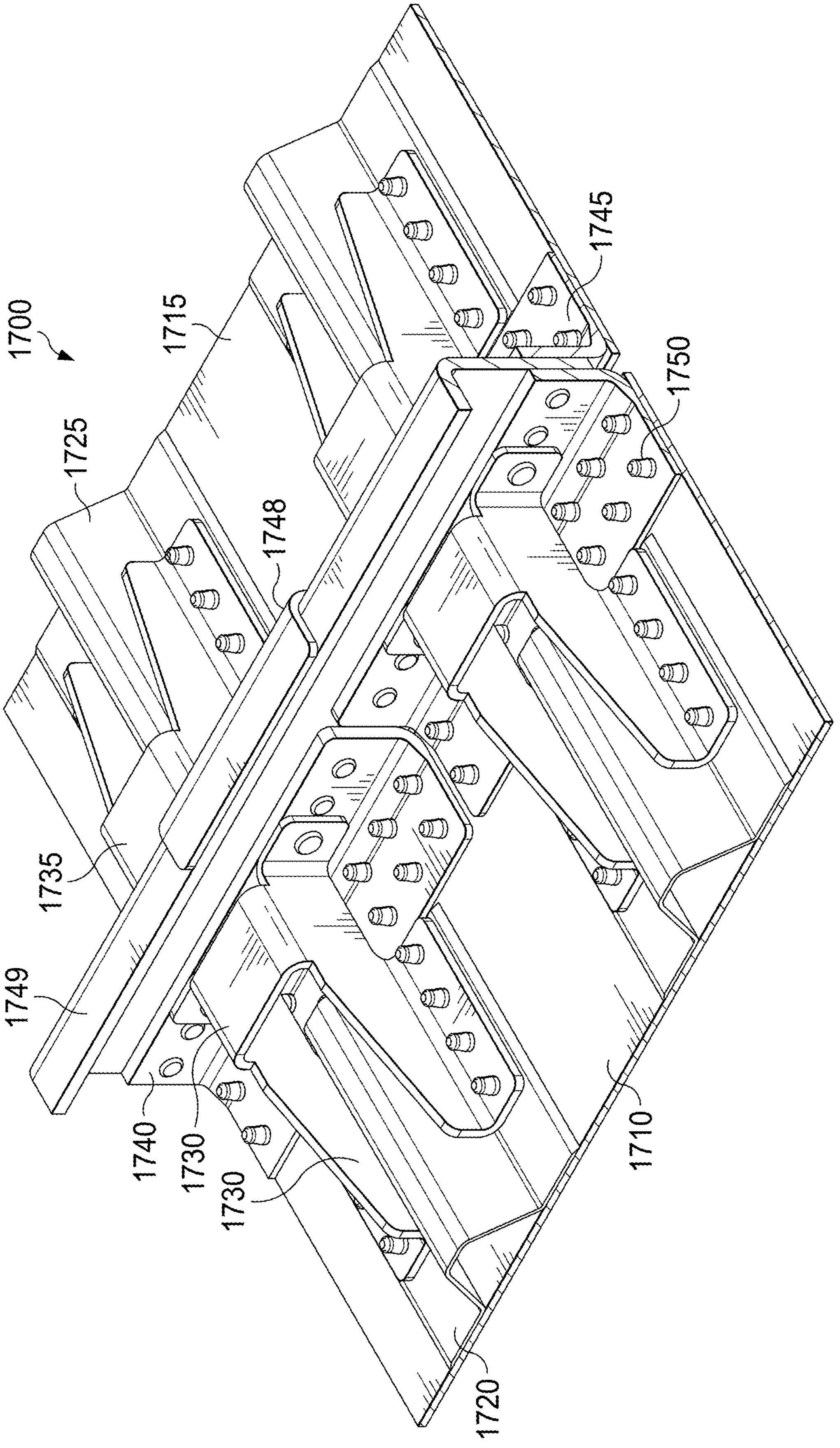
FIG. 17 is an isometric illustration of an assembly in accordance with an illustrative embodiment of the present disclosure.

Turning now to FIG. 17, an isometric illustration of an assembly 1700 is depicted in accordance with an illustrative embodiment of the present disclosure. Assembly 1700 is an example of an on-station assembly. Assembly 1700 includes aft skin panel 1710. Assembly 1700 includes forward skin panel 1715. Assembly 1700 includes aft stringer 1720. Assembly 1700 includes forward stringer 1725. Assembly 1700 includes aft thermoplastic stringer fitting 1730. Assembly 1700 includes forward thermoplastic stringer fitting 1735. Assembly 1700 includes aft thermoplastic frame detail 1740. Assembly 1700 includes forward thermoplastic frame detail 1745. An intermediate thermoplastic frame detail includes a web and an inner cord flange 1749 that meet at an intersection. Assembly 1700 includes frame detail coupler 1748 that bridges a gap between forward thermoplastic frame detail 1745 and another forward thermoplastic frame detail. In FIG. 17, fasteners 1750 can be seen on aft thermoplastic stringer fitting 1730, forward thermoplastic stringer fitting 1735, aft thermoplastic frame detail 1740 and forward thermoplastic frame detail 1745. The embodiment depicted in FIG. 17 has 1 thermoplastic stringer fitting associated with each stringer. Thus, in this embodiment each thermoplastic stringer fitting set includes 1 thermoplastic stringer fitting.

Figure 18:
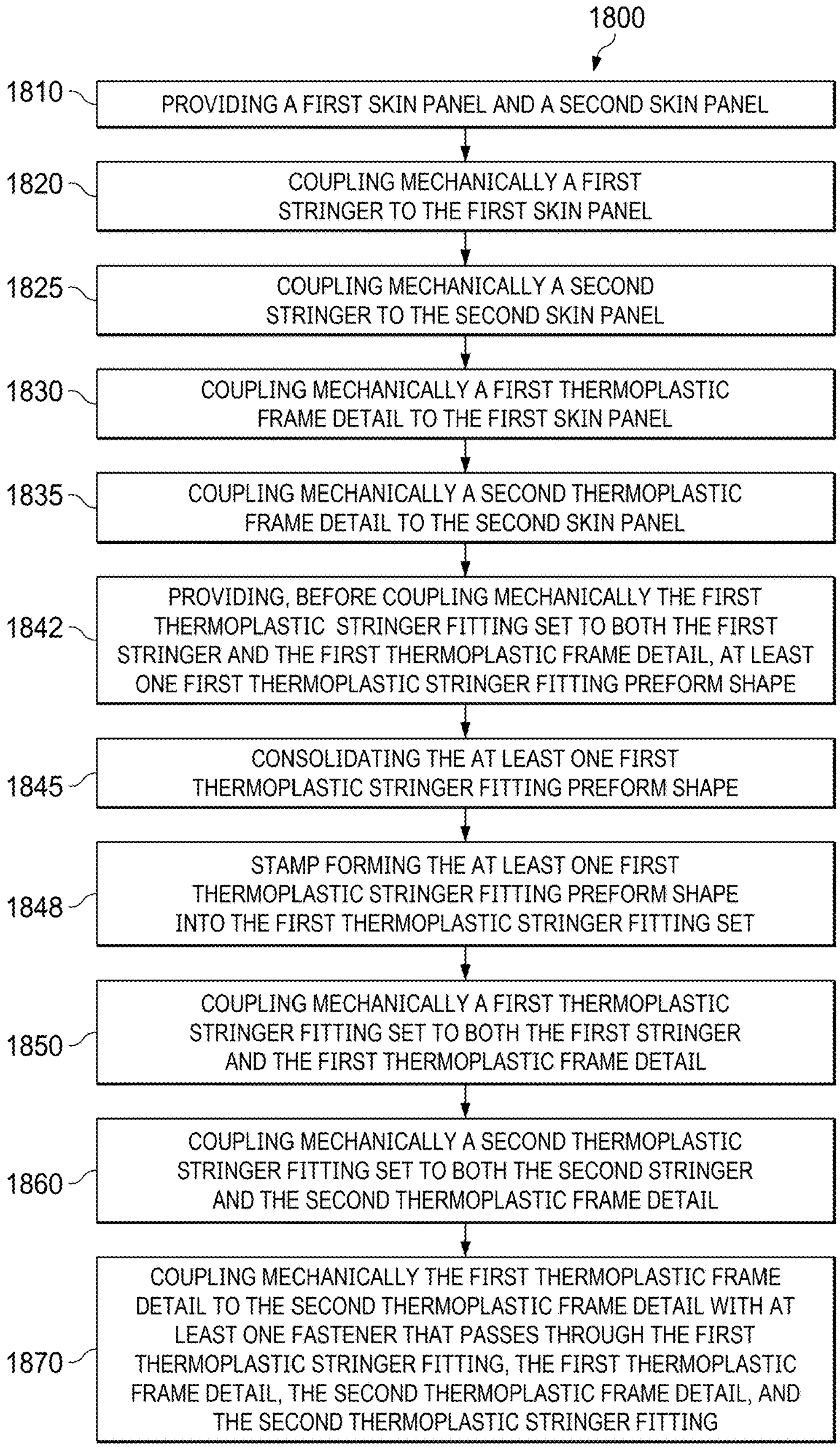
FIG. 18 is an illustration of a flow diagram of an exemplary method that can be implemented in accordance with an illustrative embodiment of the present disclosure.

Turning now to FIG. 18, a method 1800 of high-rate thermoplastic joining using a tension joint is shown. Block 1810 includes providing a first skin panel and a second skin panel. Block 1820 includes coupling mechanically a first stringer to the first skin panel. Block 1825 includes coupling mechanically a second stringer to the second skin panel. Block 1830 includes coupling mechanically a first thermoplastic frame detail to the first skin panel. Block 1835 includes coupling mechanically a second thermoplastic frame detail to the second skin panel. Block 1842 includes providing, before coupling mechanically the first thermoplastic stringer fitting set to both the first stringer and the first thermoplastic frame detail, at least one first thermoplastic stringer fitting preform shape. Block 1842 is optional. Block 1845 includes consolidating the at least one first thermoplastic stringer fitting preform shape. Block 1845 is optional. Block 1848 includes stamp forming the at least one first thermoplastic stringer fitting preform shape into the first thermoplastic stringer fitting set. Block 1848 is optional. Block 1850 includes coupling mechanically a first thermoplastic stringer fitting set to both the first stringer and the first thermoplastic frame detail. Block 1860 includes coupling mechanically a second thermoplastic stringer fitting set to both the second stringer and the second thermoplastic frame detail. Block 1870 includes coupling mechanically the first thermoplastic frame detail to the second thermoplastic frame detail with at least one fastener that passes through the first thermoplastic stringer fitting, the first thermoplastic frame detail, the second thermoplastic frame detail, and the second thermoplastic stringer fitting. Of course, methodological embodiments of the present disclosure are not limited to the foregoing example.

Figure 19:
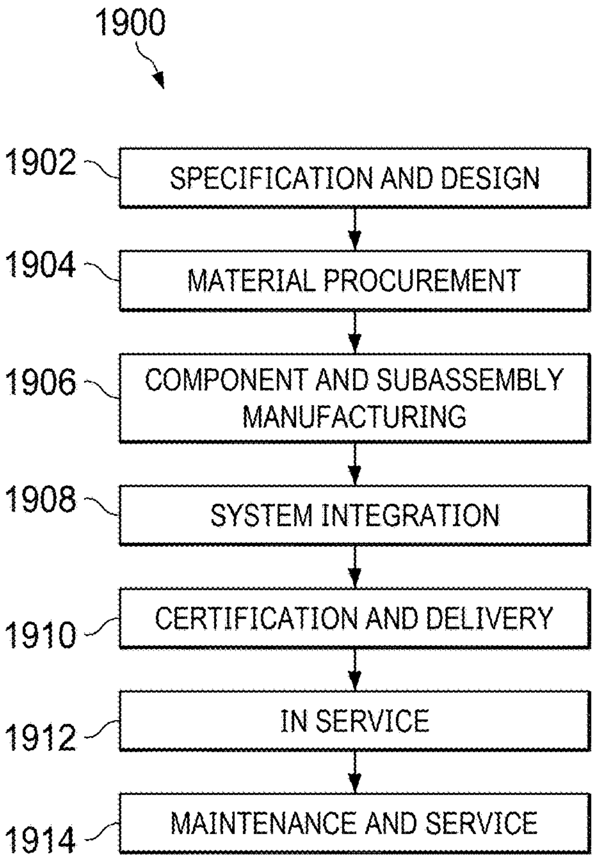
FIG. 19 is an illustration of an aircraft manufacturing and service method in a form of a block diagram in accordance with an illustrative embodiment of the present disclosure.
Figure 20:
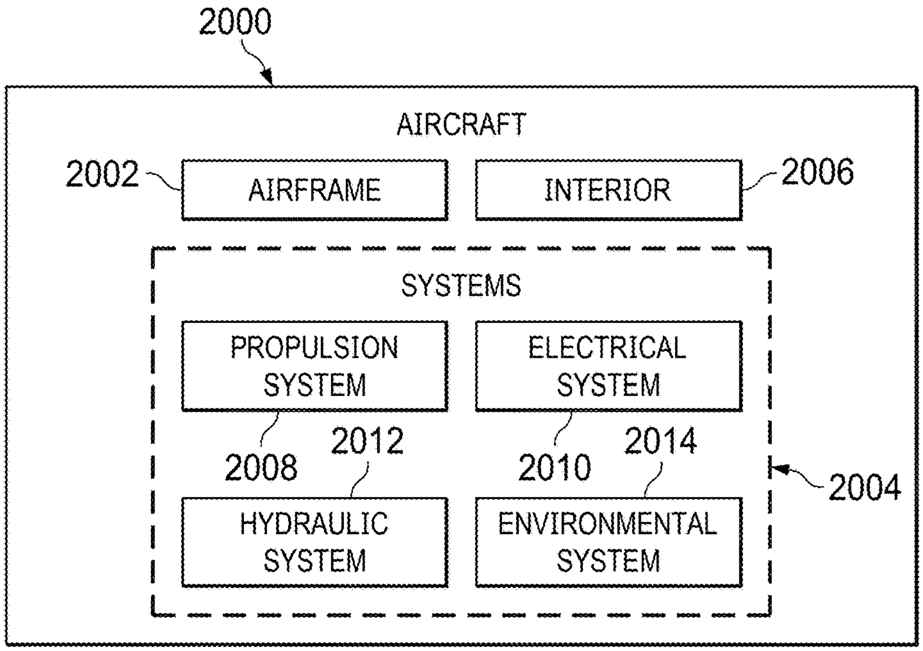
FIG. 20 is an illustration of an aircraft in a form of a block diagram in which an illustrative embodiment may be implemented in accordance with an illustrative embodiment of the present disclosure.

Illustrative embodiments of the present disclosure may be described in the context of aircraft manufacturing and service method 1900 as shown in FIG. 19 and aircraft 2000 as shown in FIG. 20. Turning first to FIG. 19, an illustration of an aircraft manufacturing and service method in a form of a block diagram is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 takes place. Thereafter, aircraft 2000 may go through certification and delivery 1910 in order to be placed in service 1912. While in service 1912 by a customer, aircraft 2000 is scheduled for routine maintenance and service 1914, which may include modification, reconfiguration, refurbishment, or other maintenance and service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of an aircraft in a form of a block diagram is depicted in which an illustrative embodiment may be implemented. In this example, aircraft 2000 is produced by aircraft manufacturing and service method 1900 of FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included.

Apparatuses and methods embodied herein may be employed during at least one of the stages of aircraft manufacturing and service method 1900 for the purpose of assembling airframe 2002. One or more illustrative embodiments may be manufactured or used during at least one of component and subassembly manufacturing 1906, system integration 1908, in service 1912, or maintenance and service 1914 of FIG. 19. A major benefit of embodiments of this disclosure is high rate manufacturing. This is enabled by moving more work to subassembly manufacturing 1906 before system integration 1908 that includes joining fuselage sections. This work that is moved can include coupling the thermoplastic frame details to the skin panels and coupling the thermoplastic stringer fittings to the frame details and the stringers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional.

As used herein, the phrase skin panel means a mechanical structure that presents a surface that may be exposed to atmospheric loading such as an exterior skin of an aircraft or other type of vehicle. As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required. As used herein, "coupled" means connect, but not necessarily mechanically and not necessarily directly. As used herein, "a number of," when used with reference to items means one or more items.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical applications, and to enable others of ordinary skill in the art to understand the disclosure for various embodiments with various modifications as are suited to the particular use contemplated.

What is claimed is:

1. An apparatus for high-rate thermoplastic join architecture, comprising:

a thermoplastic tension joint comprising:

- a first skin panel mechanically coupled to a second skin panel;
- a first stringer mechanically coupled to the first skin panel;
- a second stringer mechanically coupled to the second skin panel;
- a first thermoplastic frame detail mechanically coupled to the first skin panel;
- a second thermoplastic frame detail mechanically coupled to the second skin panel;
- a first thermoplastic stringer fitting set mechanically coupled to both the first stringer and the first thermoplastic frame detail; and
- a second thermoplastic stringer fitting set mechanically coupled to both the second stringer and the second thermoplastic frame detail, wherein the first thermoplastic frame detail is mechanically coupled to the second thermoplastic frame detail with at least one fastener that passes through at least a portion of the first thermoplastic stringer fitting set, the first thermoplastic frame detail, the second thermoplastic frame detail, and at least a portion of the second thermoplastic stringer fitting set.

2. The apparatus of claim 1, wherein the thermoplastic tension joint joins circumferential fuselage sections.

3. The apparatus of claim 1, wherein at least one of the first thermoplastic frame detail and the second thermoplastic frame detail comprises a web and an inner cord flange which meet at an intersection.

4. The apparatus of claim 3, wherein the thermoplastic tension joint is coincident with a fuselage frame station.

5. The apparatus of claim 1, wherein at least one of the first thermoplastic stringer fitting set and the second thermoplastic stringer fitting set comprises a pair of fittings, wherein each of the pair of fittings comprises a frame detail flange connected to an orthogonal web connected to a stringer flange.

6. The apparatus of claim 1, wherein at least one of the first thermoplastic stringer fitting set and the second thermoplastic stringer fitting set comprises a single fitting that comprises a first frame detail flange connected to a first orthogonal web connected to a first stringer flange, a stiffening cap connected to the first orthogonal web, a second frame detail flange connected to a second orthogonal web connected to a second stringer flange, wherein the stiffening cap is connected to the second orthogonal web and spans one of the first stringer or the second stringer.

7. The apparatus of claim 1, wherein at least one of the first thermoplastic frame detail and the second thermoplastic frame detail comprises a plurality of interlaminar layers.

8. The apparatus of claim 1, wherein at least one of the first thermoplastic stringer fitting and the second thermoplastic stringer fitting comprises a plurality of interlaminar layers.

9. An aircraft comprising the apparatus of claim 1.

10. A thermoplastic tension joint for high-rate fuselage circumferential joins, comprising:

- a first skin panel mechanically coupled to a second skin panel;
- a first stringer mechanically coupled to the first skin panel;
- a second stringer mechanically coupled to the second skin panel;
- a first thermoplastic frame detail mechanically coupled to the first skin panel;
- a second thermoplastic frame detail mechanically coupled to the second skin panel;
- a first thermoplastic stringer fitting set mechanically coupled to both the first stringer and the first thermoplastic frame detail; and
- a second thermoplastic stringer fitting set mechanically coupled to both the second stringer and the second thermoplastic frame detail,
- wherein the first thermoplastic frame detail is mechanically coupled to the second thermoplastic frame detail with at least one fastener that passes through at least a portion of the first thermoplastic stringer fitting set, the first thermoplastic frame detail, the second thermoplastic frame detail, and at least a portion of the second thermoplastic stringer fitting set,
- wherein at least one of the first thermoplastic frame detail and the second thermoplastic frame detail comprises a plurality of interlaminar layers, and
- wherein at least one of the first thermoplastic stringer fitting and the second thermoplastic stringer fitting comprises a plurality of interlaminar layers.

11. The thermoplastic tension joint of claim 10, wherein at least one of the first thermoplastic frame detail and the second thermoplastic frame detail comprises a web and an inner cord flange which meet at an intersection.

12. The thermoplastic tension joint of claim 11, wherein the thermoplastic tension joint is coincident with a fuselage frame station.

13. The thermoplastic tension joint of claim 10, wherein at least one of the first thermoplastic stringer fitting set and the second thermoplastic stringer fitting set comprises a pair of fittings, wherein each of the pair of fittings comprises a frame detail flange connected to an orthogonal web connected to a stringer flange.

14. The thermoplastic tension joint of claim 10, wherein at least one of the first thermoplastic stringer fitting set and the second thermoplastic stringer fitting set comprises a single fitting that comprises a first frame detail flange connected to a first orthogonal web connected to a first stringer flange, a stiffening cap connected to the first orthogonal web, a second frame detail flange connected to a second orthogonal web connected to a second stringer flange, wherein the stiffening cap is connected to the second orthogonal web and spans one of the first stringer or the second stringer.

15. An aircraft comprising the thermoplastic tension joint of claim 10.

16. A method of high-rate thermoplastic joining using a tension joint, comprising:

- providing a first skin panel and a second skin panel;
- coupling mechanically a first stringer to the first skin panel;
- coupling mechanically a second stringer to the second skin panel;
- coupling mechanically a first thermoplastic frame detail to the first skin panel;
- coupling mechanically a second thermoplastic frame detail to the second skin panel;
- coupling mechanically a first thermoplastic stringer fitting set to both the first stringer and the first thermoplastic frame detail;
- coupling mechanically a second thermoplastic stringer fitting set to both the second stringer and the second thermoplastic frame detail; and
- coupling mechanically the first thermoplastic frame detail to the second thermoplastic frame detail with at least one fastener that passes through the first thermoplastic stringer fitting, the first thermoplastic frame detail, the second thermoplastic frame detail, and the second thermoplastic stringer fitting.

17. The method of claim 16, wherein the tension joint is located between circumferential fuselage sections.

18. The method of claim 16, further comprising:

- providing, before coupling mechanically the first thermoplastic stringer fitting set to both the first stringer and the first thermoplastic frame detail, at least one first thermoplastic stringer fitting preform shape;
- consolidating the at least one first thermoplastic stringer fitting preform shape; and
- stamp forming the at least one first thermoplastic stringer fitting preform shape into the first thermoplastic stringer fitting set.

19. The method of claim 18, wherein stamp forming comprises a plurality of stages.

20. The method of claim 16, further comprising:

- providing, before coupling mechanically the first thermoplastic frame detail to the first skin panel, a first thermoplastic frame detail preform shape;

consolidating the first thermoplastic frame detail preform shape; and stamp forming the first thermoplastic frame detail preform shape into the first thermoplastic frame detail.

* * * * *